United States Patent
Yager et al.

(10) Patent No.: US 9,640,846 B2
(45) Date of Patent: May 2, 2017

(54) AIR CATHODE TUBES FOR RECHARGEABLE METAL AIR BATTERIES

(75) Inventors: Thomas A. Yager, Encinitas, CA (US); Seth Adrian Miller, Englewood, CO (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1520 days.

(21) Appl. No.: 12/999,301

(22) PCT Filed: Sep. 28, 2010

(86) PCT No.: PCT/US2010/050552
§ 371 (c)(1),
(2), (4) Date: Dec. 15, 2010

(87) PCT Pub. No.: WO2012/044283
PCT Pub. Date: Apr. 5, 2012

(65) Prior Publication Data
US 2012/0077094 A1    Mar. 29, 2012

(51) Int. Cl.
*H01M 12/08*  (2006.01)
*H01M 4/86*  (2006.01)
(Continued)

(52) U.S. Cl.
CPC ......... *H01M 12/08* (2013.01); *H01M 4/8626* (2013.01); *H01M 4/9016* (2013.01);
(Continued)

(58) Field of Classification Search
CPC ...... H01M 12/08; H01M 12/04; H01M 12/06; H01M 4/8626; H01M 4/9016; H01M 4/9041; H01M 4/92; Y02E 60/128
(Continued)

(56) References Cited

U.S. PATENT DOCUMENTS 4,545,926 A   10/1985   Fouts, Jr. et al.
6,127,061 A   10/2000   Shun et al.
(Continued)

FOREIGN PATENT DOCUMENTS

JP   2001-313093 A     11/2001
KR   20010101692 A1    11/2001
(Continued)

OTHER PUBLICATIONS

Bruce Dunn, Jeffrey W. Long, Debra R. Rolison, Rethinking Multifunction in Three Dimensions for Miniaturizing Electrical Energy Storage, The Electrochemical Society Interface, Fall 2008, pp. 49-53.
(Continued)

*Primary Examiner* — Raymond Alejandro
(74) *Attorney, Agent, or Firm* — Turk IP Law, LLC (57) ABSTRACT

Implementations and techniques are generally disclosed are generally described for providing a metal air batter comprising, a cathode tube included in the metal air battery, the cathode tube having a conductive outer surface and a hydrophobic inner surface configured to define a tube wall there between, wherein the tube wall includes polymeric material and an anode material that surrounds the cathode tube.

23 Claims, 5 Drawing Sheets

(51) Int. Cl.
*H01M 4/90* (2006.01)
*H01M 4/92* (2006.01)
(52) U.S. Cl.
CPC .......... *H01M 4/9041* (2013.01); *H01M 4/92* (2013.01); *Y02E 60/128* (2013.01)
(58) Field of Classification Search
USPC ....... 429/402, 403, 405, 406, 523, 529, 149, 429/160
See application file for complete search history.

(56) References Cited

U.S. PATENT DOCUMENTS

| | | |
|---|---|---|
| 6,190,792 B1 | 2/2001 | Faris et al. |
| 6,274,261 B1 | 8/2001 | Tinker et al. |
| 6,479,188 B1 | 11/2002 | Chi et al. |
| 7,238,448 B1 | 7/2007 | Kaplan et al. |
| 7,560,194 B2 | 7/2009 | Lin et al. |
| 2007/0166602 A1 | 7/2007 | Burchardt |
| 2008/0124599 A1* | 5/2008 | Baik ............................... 429/29 |
| 2008/0171266 A1* | 7/2008 | Kato ....................... H01M 2/16 429/303 |
| 2008/0187062 A1 | 8/2008 | Pan et al. |

FOREIGN PATENT DOCUMENTS

| | | |
|---|---|---|
| WO | 00/44057 A1 | 7/2000 |
| WO | 2009/135030 A1 | 11/2009 |

OTHER PUBLICATIONS

Arthur Dobley, Joseph Dicarlo and K. M. Abraham, Non-aqueous Lithium-Air Batteries with an Advanced Cathode Structure, in Proceedings of 41st Power Sources Conference, Philadelphia, PA, 2004, as accessed on Dec. 13, 2010 at http://www.yardney.com/Lithion/Documents/PaprAD-JD-KMA.pdf.

Fu, L., et al., "Design and fabrication of a micro zinc/air battery," Journal of Physics: Conference Series 34, IOP Publishing Ltd, pp. 800-805 (2006) 800-805.

Sea, B., et al., "Comparison of Porous Hollow Fibers as a Membrane Contactor for Carbon Dioxide Absorption," J. Ind. Eng. Chem., vol. 8, No. 3, pp. 290-296 (2002).

Sotiropoulos, S., et al., "Nickel incorporation into a hollow fibre microporous polymer: a preparation route for novel high surface area nickel structures," Materials Letters, vol. 35, No. 5, pp. 383-391 (1998).

Zhu, W.H., et al., "New Structures of Thin Air Cathodes for Zinc-Air Batteries," Journal of Applied electrochemistry, Kulwer Academic Publisher, vol. 33, Issue. 1, pp. 29-36 (2003).

International Search Report for International Application No. PCT/US2010/050552, European Patent Office, The Hague, Netherlands, mailed on Nov. 17, 2010.

http://www.cytonix.com/fluoropel.html, 2012. Accessed online on Jun. 4, 2013.

* cited by examiner

AIR CATHODE TUBES FOR RECHARGEABLE METAL AIR BATTERIES

CROSS-REFERENCE TO RELATED APPLICATION

The present application is a U.S. National Stage filing under 35 U.S.C. §371 of International Application No. PCT/US2010/050552, filed on Sep. 28, 2010.

BACKGROUND

Unless otherwise indicated herein, the approaches described in this section are not prior art to the claims in this application and are not admitted to be prior art by inclusion in this section.

High energy density metal air batteries, such as Zn-Air batteries, can be inexpensive to produce and are often viewed as environmentally friendly alternatives to other battery types. Metal air batteries are most commonly used as primary (non-rechargeable) batteries. As secondary (rechargeable) batteries, metal air battery cathodes may be prone to damage caused by oxygen gas generated within the cathode material during charging. Practical limits for recharging have been determined to be around 100 mA/cm$^2$ in order to avoid cathode damage. Adopting a tubular cathode structure may allow for greater recharge potential by providing increased cathode surface area while remaining within the practical charge limit.

SUMMARY

Metal air battery systems and/or devices are described including processes for forming rechargeable metal air battery cathode tubes including receiving tube precursor material and forming a cathode tube from the tube precursor material. The cathode tube precursor material may include polymeric material. Each cathode tube may include a tube wall defined by an outer surface and an inner surface. Forming the cathode tube may include forming pores within the tube wall.

Metal air battery systems and/or devices are described including cathode tubes for rechargeable metal air batteries where each tube may have a conductive outer surface and a hydrophobic inner surface. In some implementations, precursor material used to form cathode tubes may include conducting metal particles. Each cathode tube may include a tube wall defined by an outer surface and an inner surface and the tube wall may include polymeric material having pores extending from the conductive outer surface into the tube wall.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the embodiments of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to metal air batteries employing cathode tubes.

In accordance with some implementations of the present disclosure one or more cathodes of a metal air battery may be formed from tubes. The cathode tubes may be formed from polymer material combined with catalytic particles. In various examples, materials such as Ni, Ag, Pt, Pt—Ru, La$_2$O$_3$, Ag$_2$O, Perovskites, Fe and/or Spinels may be added to the composition of the material used to form cathode tubes. In some examples, polymers such as polytetrafluoroethylene (PTFE) or polyethylene may be employed to form cathode tubes. In some examples, hydrophilic polymer material may be used to form cathode tubes and the cathode tube's inner surface may be rendered hydrophobic by treating it with a hydrophobic coating material such as an amorphous fluoropolymer.

In accordance with some implementations of the present disclosure, hydrophilic pores or voids enabling electrolyte to permeate a cathode tube wall may be formed by adding hydrophilic particles, such as high surface area carbon, for example, to the material used to form cathode tubes. In other examples, pores or voids in cathode tube walls may be formed by adding ammonium bicarbonate to the material used to form cathode tubes.

In accordance with some implementations of the present disclosure the cathode tubes may be electrically connected together, and may have a hollow interior containing air and may be surrounded by anode material. Anode material may include Zn powder, hydroxyl (e.g., KOH) electrolyte, and gel. Multiple cathode tubes may be arranged in various ways including linear arrays, rectangular arrays, etc. When subjected to either charging or discharging, the wall of the cathode tube may be permeable to air and electrolyte, and may be electrically conductive. Additionally, the cathode tube may prevent liquid from reaching the inside of the tube. Cathode reactions may occur within the wall of a tube, with the reaction components including air provided inside the tube and anode paste (metal powder, gel, electrolyte, etc.) provided on the outside of the tube.

In accordance with some implementations of the present disclosure, cathode tubes may be formed by extruding a mixture of polymer, nickel particles, other catalysts, and/or pore forming particles through a die. In various examples, cathode tubes may be incorporated into the fabrication of metal air batteries by cutting the tubes to the proper length, forming the tubes into the cathode configuration and electrically connected the tubes together. In addition, prior to loading the cathode tubes into a battery enclosure, the tubes may be wrapped in a separator layer such hydrophilic fabric soaked in electrolyte. Finally, the cathode tube assembly may be inserted into a battery enclosure and, in turn, the enclosure sealed to prevent leaking of the electrolyte. Air metal batteries in accordance with various implementations of the present disclosure may have a variety of shapes. For example, cathode tubes may be arranged to enable flat-pack rechargeable metal air batteries, or inserted into a cylindrical anode casing to enable D, A, AAA-type, etc. battery configurations.

While cathode tubes may be formed with conductive particles incorporated in the tube forming materials as described above, in accordance with some other implementations of the present disclosure hydrophobic hollow fibers may be manufactured and then coated with cathodic material. For example, hollow tubes may be formed from highly porous PTFE, polyethylene, and/or other hydrophobic polymers. Such materials may contain numerous cells of 1-100 µm diameter interconnected by smaller pores of 0.1 to 10 µm diameter. The structure and size of the pores may be modified in the production process. The exterior of the tube surface then be seeded with Pd and subsequently plated with electroless Ni and/or Pd to form a conductive exterior surface.

Figure 1:
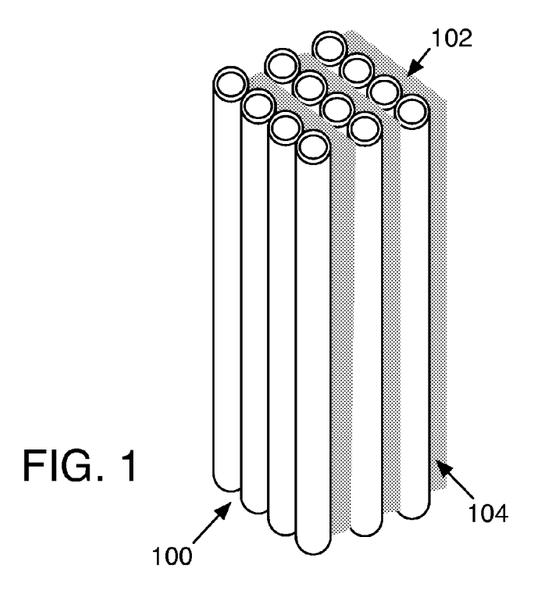
FIG. 1 is an illustrative diagram of portions of an example metal air battery.
Figure 2:
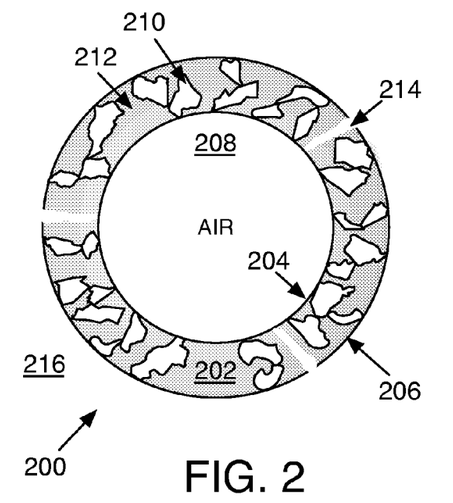
FIG. 2 is an illustrative diagram of an example metal air battery cathode tube.

FIG. 1 illustrates an example portion of a metal air battery 100 arranged in accordance with at least some embodiments of the present disclosure. Battery 100 may include cathode tubes 102 arranged with anode material 104 adjacent to tubes 102. Although not shown explicitly in FIG. 2, tubes 102 may be electrically coupled together. FIG. 2 illustrates a cross section of an example cathode tube 200 arranged in accordance with at least some embodiments of the present disclosure. Tube 200 may be employed, for example, in battery 100 of FIG. 1. Tube 200 may include a tube wall 202 having a hydrophobic inner surface 204 and a conductive outer surface 206. Tube 200 may also include a hollow interior region 208 defined by tube wall 202.

Tube wall 202 may be formed from tube precursor material including polymer material, conductive particles, catalytic material and/or pore forming material. In some examples, tube wall 202 may be formed from precursor material including hydrophobic polymer material such as polytetrafluoroethylene (PTFE) or polyethylene, conductive Nickel particles, catalytic material such as Ni, Ag, Pt, Pt—Ru, $La_2O_3$, $Ag_2O$, Perovskites, Fe and/or Spinels, and/or pore forming material such as hydrophilic particles (e.g., high surface area carbonaceous materials) and/or ammonium bicarbonate. Once formed, tube wall 202 may include conductive particles 210 and catalytic particles embedded within a polymer matrix 212, and hydrophilic pores 214 permitting electrolyte to at least partially permeate the interior of tube wall 202. In some implementations, pores 214 may extend from outer surface 206 through at least a portion of tube wall 202. In various examples, Anode material 216 surrounding and/or adjacent to tube 200 may include Zn, electrolyte and/or gel.

In some examples, the polymer material used to form tube wall 202 may include hydrophilic polymer material. In other examples, polymeric material used to form tube wall 202 may be processed such that outer surface 206 may be rendered hydrophilic. For example, a tube wall 202 including PTFE may have outer surface 206 oxidized by, for example, exposure to a corona discharge, in order to render outer surface 206 hydrophilic. In various examples, the interior of tube 202 may be coated with a hydrophobic material such as an amorphous fluoropolymer to form hydrophobic inner surface 204.

Figure 3:
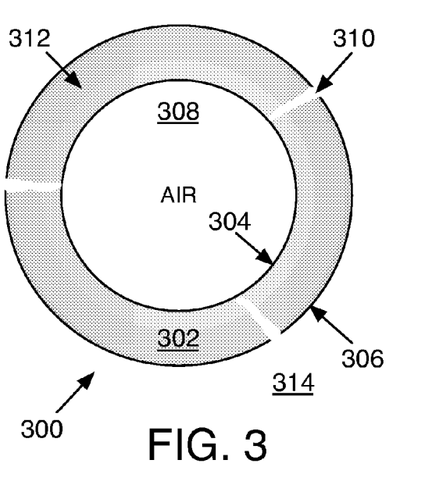
FIG. 3 is an illustrative diagram of another example metal air battery cathode tube.

FIG. 3 illustrates a cross section of another example cathode tube 300 arranged in accordance with at least some embodiments of the present disclosure. Tube 300 may be employed, for example, in battery 100 of FIG. 1. Tube 300 may include a tube wall 302 having a hydrophobic inner surface 304, a conductive outer surface 306, and a hollow interior region 308.

Tube wall 302 may be formed from tube precursor material including polymer material. In some examples, tube wall 302 may be formed from precursor material including hydrophobic polymer material such as PTFE and/or polyethylene resulting in hydrophobic inner surface 304. Further, conductive outer surface 306 may include Ni and/or Pd material formed, for example, by seeding the exterior of tube wall 302 with Pd and then electroless plating Ni and/or Pd onto the seeded surface. Once formed, tube wall 302 may include hydrophilic pores 310 distributed within a polymer matrix 312. Pores 310 may extend from outer surface 306 through at least a portion of tube wall 302 permitting electrolyte to at least partially permeate the interior of tube wall 302. Anode material 314 surrounding and/or adjacent to tube 300 may include Zn, electrolyte and/or gel.

Figure 4:
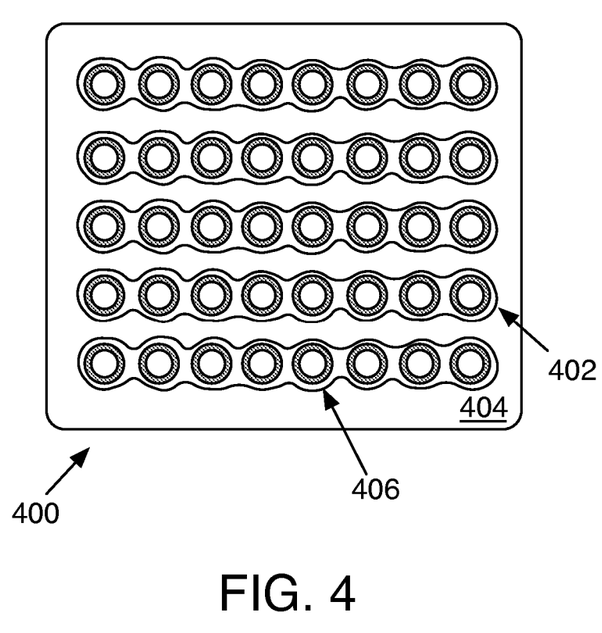
FIG. 4 is an illustrative diagram of portions of another example metal air battery.

FIG. 4 illustrates an example metal air battery 400 arranged in accordance with at least some embodiments of the present disclosure. Battery 400 includes an array 402 of cathode tubes (e.g., cathode tubes 200 or 300) immersed in anode material 404 such as Zn, electrolyte and gel. Battery 400 may also include separator material 406, such as fabric soaked in electrolyte, surrounding the cathode tubes of array 402.

While cathode tubes illustrated herein, such as cathode tube 200 of FIG. 2, are depicted as having circular cross-sections, claimed subject matter is not limited in this regard and cathode tubes having other shapes may also be employed, including cathode tubes having cross-sections that are oval, square, rectangular, etc. Further, while metal air batteries illustrated herein, such as battery 400 of FIG. 4, are depicted as having rectangular form factors, claimed subject matter is not limited in this regard and metal air batteries in accordance with various implementations of the present disclosure may have any of a variety of form factors. For example, cathode tubes may be arranged in a planar array to enable flat-pack metal air batteries and/or flexible metal air batteries, or may be inserted into cylindrical anode casings to enable D, C, A, AA, AAA type metal air batteries, etc.

Figure 5:
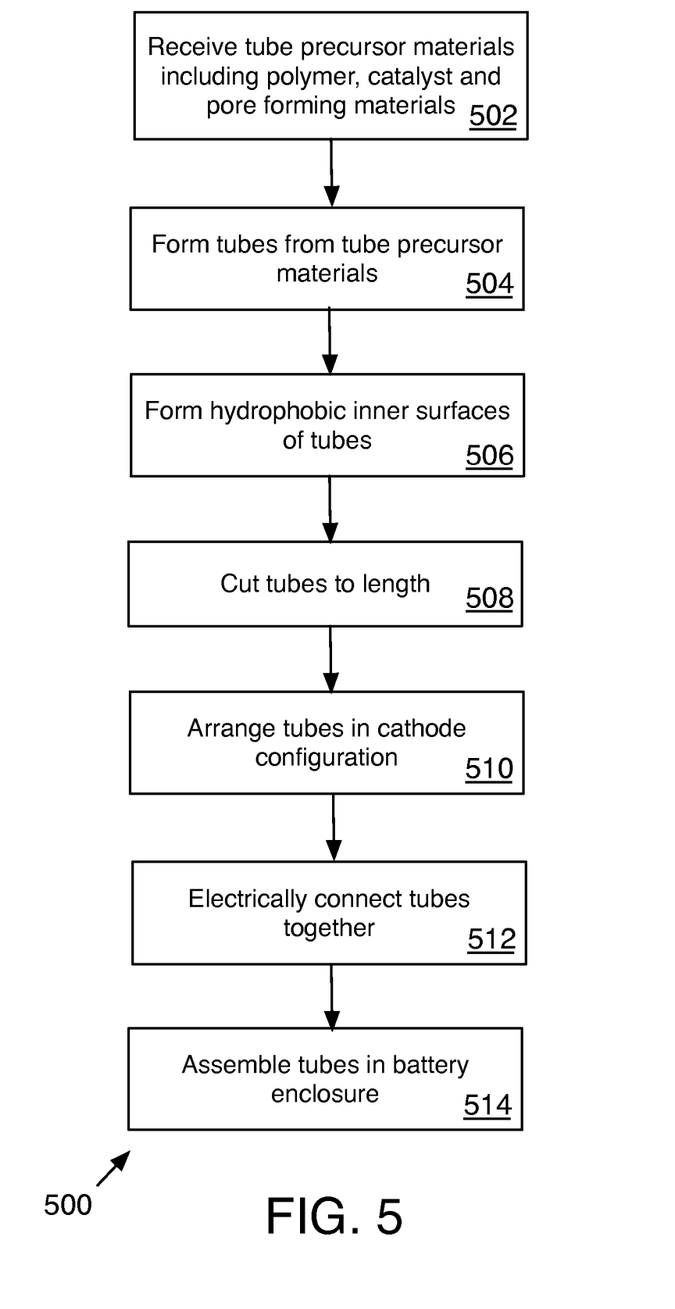
FIG. 5 is an illustration of an example process for the manufacture of metal air batteries.

FIG. 5 illustrates a flow diagram of a process 500 for manufacturing cathode tubes and/or metal air batteries including cathode tubes according to various implementations of the present disclosure. Process 500 may include one or more operations, functions or actions as illustrated by one or more of blocks 502, 504, 506, 508, 510, 512 and/or 514. Process 500 may begin at block 502.

At block 502, cathode tube precursor material may be received. For example, precursor material including polymer, conductive particles, catalyst and/or pore forming materials, as described above, may be received in block 502 at a tube-forming tool such as tube-forming tool including an extrusion die mechanism. At block 504, cathode tubes may be formed from the precursor material. For example, in undertaking block 504, the precursor material may be processed by a tube-forming tool including an extrusion die mechanism.

At block 506, hydrophobic inner surfaces of the cathode tubes may be formed. In various examples a hydrophobic coating material, such as an amorphous fluoropolymer, may be applied to the interior of the cathode tubes in undertaking block 506. At block 508 the cathode tubes may be cut to a length suitable for any particular form factor.

At block 510 the cathode tubes may be arranged in a particular cathode configuration. In various examples, the cathode tubes may be arranged in block 510 to form a rectangular array such as illustrated in FIG. 4. At block 512, the cathode tubes may be electrically connected or coupled together. In various examples the cathode tubes may be electrically coupled in block 512 by plating conductive material (not shown) across a portion of the cathode configuration provided in block 510. In other examples, the cathode tubes may be electrically connected together by applying conductive paste (not shown) across the cathode tubes. At block 514 the cathode tubes may be placed in a battery enclosure.

Figure 6:
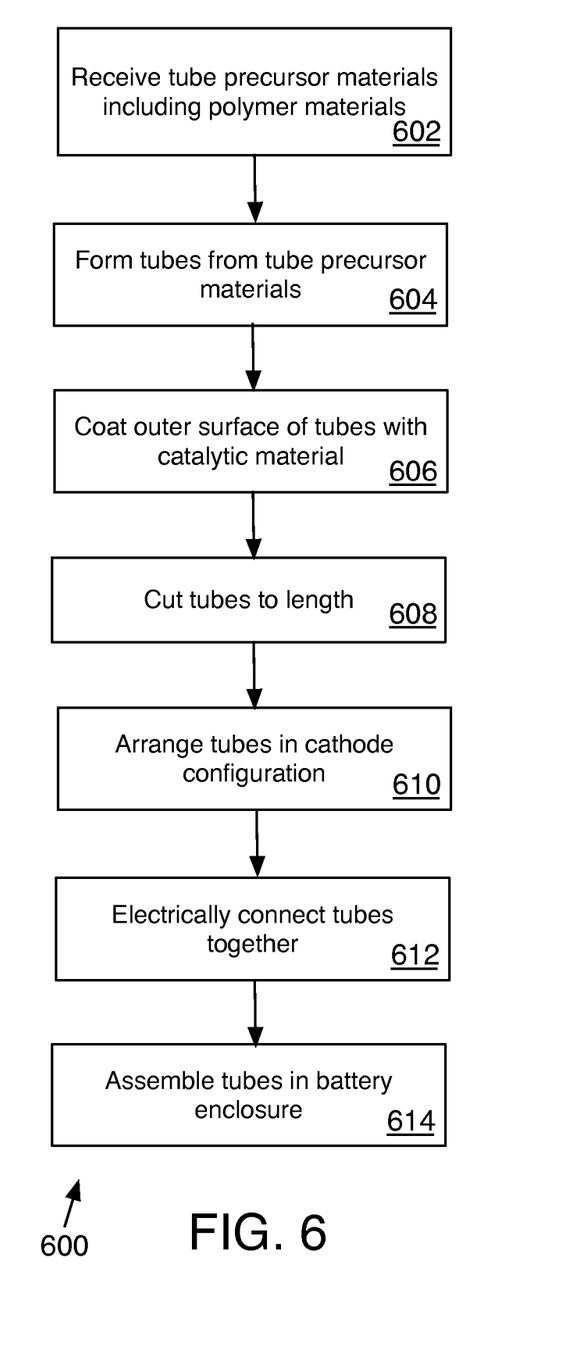
FIG. 6 is an illustration of another example process for the manufacture of metal air batteries.

FIG. 6 illustrates a flow diagram of a process 600 for manufacturing cathode tubes and/or metal air batteries including cathode tubes according to various implementations of the present disclosure. Process 600 may include one or more operations, functions or actions as illustrated by one or more of blocks 602, 604, 606, 608, 610, 612 and/or 614. Process 600 may begin at block 602.

At block 602, cathode tube precursor material including polymer materials may be received. For example, hydrophobic polymer material such as PTFE or polyethylene may be received in block 602 at a tube-forming tool such as tube-forming tool including an extrusion die mechanism. At block 604, cathode tubes may be formed from the precursor material. For example, in undertaking block 604, the precursor material may be processed by a tube-forming tool including an extrusion die mechanism.

At block 606, the exterior of the cathode tubes may be coated with catalytic material. In various examples the tubes may be coated with catalytic material by seeding the tube exterior with Pd and then electroless depositing Pd and/or Ni on the seeded surfaces. At block 608 the cathode tubes may be cut to a length suitable for any particular form factor.

At block 610 the cathode tubes may be arranged in a particular cathode configuration. In various examples, the cathode tubes may be arranged in block 610 to form a rectangular array such as illustrated in FIG. 4. At block 612, the cathode tubes may be electrically connected together. In various examples the cathode tubes may be electrically coupled in block 612 by plating conductive material (not shown) across a portion of the cathode configuration provided in block 610. In other examples, the cathode tubes may be electrically connected together by applying conductive paste (not shown) across the cathode tubes. At block 614 the cathode tubes may be placed in a battery enclosure.

Figure 7:
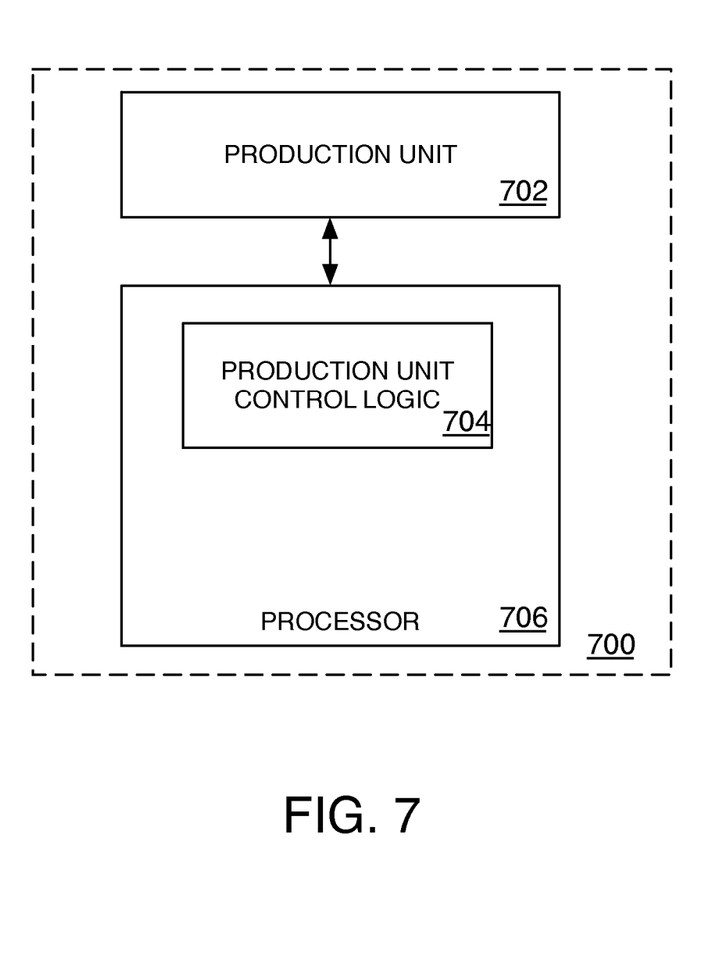
FIG. 7 is an illustrative diagram of an example system.

FIG. 7 illustrates an example system 700 for manufacturing cathode tubes and/or metal air batteries including cathode tubes in accordance with at least some implementations of the present disclosure. System 700 may include a production unit 702 operably coupled to a processor 706 that may include production unit control logic 704. Production unit 702 may include any arrangement of production and assembly tools and/or systems, such as one or more forming tools, that may be utilized to undertake the manufacture of devices and/or systems such as those illustrated in FIGS. 1-4 using, for example, processes 500 or 600.

Production unit control logic 704 may be configured to provide functional control of any arrangement of production and assembly tools and/or systems, such as one or more forming tools, and may include hardware, software or firmware logic and/or any combination thereof although claimed subject matter is not limited to specific types or manifestations of processing unit control logic. Processor 706 may be a microprocessor or Central Processing Unit (CPU). In other implementations, processor 706 may be an Application Specific Integrated Circuit (ASIC), a Field Programmable Gate Array (FPGA), a digital signal processor (DSP), or other integrated formats. Processor 706 and production unit 702 may be configured to communicate by any suitable means, such as, for example, by wired connections or wireless connections.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include a global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. An apparatus, comprising:
    a rechargeable metal air battery that includes a cathode tube wrapped in a fabric separator layer, wherein the cathode tube includes:
        a conductive outer surface;
        a hydrophobic inner surface;
        a tube wall between the conductive outer surface and the hydrophobic inner surface, wherein an exterior surface of the tube wall is plated with a palladium (Pd)-based material; and
        a polymeric material that includes pores therein configured to extend from the conductive outer surface into the Pd-based exterior surface of the tube wall.

2. The apparatus of claim 1, wherein the polymeric material includes at least one of polytetrafluoroethylene or polyethylene.

3. The apparatus of claim 1, wherein the tube wall includes conductive particles and a catalytic material embedded within the polymeric material.

4. The apparatus of claim 3, wherein the catalytic material includes one or more of Ag, Pt, Pt—Ru, $La_2O_3$, $Ag_2O$, and Fe.

5. The apparatus of claim 1, wherein the hydrophobic inner surface includes an amorphous fluoropolymer.

6. An apparatus comprising:
    a rechargeable metal air battery that includes:
        cathode tubes electrically coupled together within rechargeable metal air battery, wherein at least one of the cathode tubes includes:
            a conductive outer surface;
            a hydrophobic inner surface;
            a tube wall between the conductive outer surface and the hydrophobic inner surface, wherein an exterior surface of the tube wall is plated with a palladium (Pd)-based material; and
            a polymeric material that includes pores therein configured to extend from the conductive outer surface into the Pd-based exterior surface of the tube wall;
        a separator layer that includes a hydrophilic fabric saturated with an electrolyte; and
        an anode material that surrounds the at least one of the cathode tubes.

7. The apparatus of claim 6, wherein the polymeric material includes at least one of polytetrafluoroethylene or polyethylene.

8. The apparatus of claim 6, wherein the tube wall includes conductive particles and a catalytic material embedded within the polymeric material.

9. The apparatus of claim 8, wherein the catalytic material includes one or more of Ag, Pt, Pt—Ru, $La_2O_3$, $Ag_2O$, and Fe.

10. The apparatus of claim 6, wherein the hydrophobic inner surface includes an amorphous fluoropolymer.

11. The apparatus of claim 6, wherein the cathode tubes are arranged as one or more linear arrays.

12. The apparatus of claim 6, wherein the cathode tubes are arranged as one or more rectangular arrays.

13. An apparatus, comprising:
    a rechargeable metal air battery that includes:
        a cathode tube, wherein the cathode tube includes:
            a conductive outer surface;
            a hydrophobic inner surface;
            a tube wall between the conductive outer surface and the hydrophobic inner surface, wherein an exterior of the tube wall is plated with a palladium (Pd)-based material; and
            a polymeric material that includes pores therein configured to extend from the conductive outer surface into the Pd-based exterior of the tube wall; and
        an anode material that surrounds the cathode tube.

14. The apparatus of claim 13, wherein the polymeric material includes at least one of polytetrafluoroethylene or polyethylene.

15. The apparatus of claim 13, wherein the tube wall includes conductive particles and a catalytic material embedded within the polymeric material.

16. The apparatus of claim 13, wherein the anode material includes one or more of a Zn powder, a hydroxyl electrolyte, and a gel.

17. The apparatus of claim 13, wherein the hydrophobic inner surface includes an amorphous fluoropolymer.

18. The apparatus of claim 15, wherein the catalytic material includes one or more of Ag, Pt, Pt—Ru, $La_2O_3$, $Ag_2O$, and Fe.

19. The apparatus of claim 13, further comprising a separator layer between the cathode tube and the anode material.

20. The apparatus of claim 19, wherein the separator layer includes a hydrophilic fabric.

21. The apparatus of claim 19, wherein the separator layer includes a hydrophilic fabric saturated with an electrolyte.

22. The apparatus of claim 13, wherein the polymeric material includes a hydrophilic pore configured to draw an electrolyte into the tube wall.

23. The apparatus of claim 13, wherein the tube wall includes a composite of the polymeric material impregnated with conductive particles and a catalytic material.

* * * * *

UNITED STATES PATENT AND TRADEMARK OFFICE
CERTIFICATE OF CORRECTION

| | | |
|---|---|---|
| PATENT NO. | : 9,640,846 B2 | Page 1 of 1 |
| APPLICATION NO. | : 12/999301 | |
| DATED | : May 2, 2017 | |
| INVENTOR(S) | : Yager et al. | |

It is certified that error appears in the above-identified patent and that said Letters Patent is hereby corrected as shown below:

On the Title Page

In Item (57), under "ABSTRACT", in Column 2, Line 1, delete "are generally disclosed are" and insert -- are --, therefor.

In Item (57), under "ABSTRACT", in Column 2, Line 2, delete "batter" and insert -- battery --, therefor.

In the Claims

In Column 10, Line 13, in Claim 6, delete "apparatus" and insert -- apparatus, --, therefor.

In Column 10, Line 15, in Claim 6, delete "within" and insert -- within the --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*